US008733591B2

(12) United States Patent
Ganzeboom et al.

(10) Patent No.: US 8,733,591 B2
(45) Date of Patent: May 27, 2014

(54) FLUID PRODUCT DISPENSER WITH SHUNTING CHAMBER AND GOVERNING DEVICE

(75) Inventors: Wilhelmus Everhardus Ganzeboom, Haarlem (NL); Oscar Toetenel, Rotterdam (NL); Tjeerd Jan Pieter Gerbranda, The Hague (NL); Eduard Johannes Hendricus Bunnik, The Hague (NL)

(73) Assignee: G.A.B. Develoment & Engineering B.V., Heemstede (NL)

( * ) Notice: Subject to any disclaimer, the term of this patent is extended or adjusted under 35 U.S.C. 154(b) by 604 days.

(21) Appl. No.: 12/894,960

(22) Filed: Sep. 30, 2010

(65) Prior Publication Data

US 2011/0079614 A1  Apr. 7, 2011

Related U.S. Application Data

(60) Provisional application No. 61/248,622, filed on Oct. 5, 2009.

(30) Foreign Application Priority Data

Oct. 4, 2009  (EP) ..................................... 09012541

(51) Int. Cl.
*A47K 5/12* (2006.01)
*A47K 5/14* (2006.01)

(52) U.S. Cl.
USPC .......... 222/63; 222/181.3; 222/190; 222/207; 222/320

(58) Field of Classification Search
USPC ................ 222/181.1, 181.3, 180, 182, 383.1, 222/189.06, 190, 63, 105, 320, 321.1, 222/321.6, 321.7, 207, 212, 214
See application file for complete search history.

(56) References Cited

U.S. PATENT DOCUMENTS

| 2,849,159 | A | * | 8/1958 | Kaufmann | 222/309 |
|---|---|---|---|---|---|
| 4,168,020 | A | | 9/1979 | Benson | |
| 4,330,071 | A | | 5/1982 | Ohlson | |
| 4,515,294 | A | * | 5/1985 | Udall | 222/105 |
| 5,033,656 | A | * | 7/1991 | Blette et al. | 222/212 |
| 5,255,822 | A | * | 10/1993 | Mease et al. | 222/63 |
| 5,271,530 | A | | 12/1993 | Uehira et al. | |
| 5,439,140 | A | * | 8/1995 | Meyer | 222/110 |
| 5,445,288 | A | | 8/1995 | Banks | |
| 5,836,482 | A | * | 11/1998 | Ophardt et al. | 222/325 |
| 6,012,613 | A | * | 1/2000 | Chen | 222/207 |
| 6,149,804 | A | * | 11/2000 | Chung et al. | 210/192 |

(Continued)

*Primary Examiner* — Kevin P Shaver
*Assistant Examiner* — Patrick M Buechner
(74) *Attorney, Agent, or Firm* — Pillsbury Winthrop Shaw Pittman, LLP

(57) ABSTRACT

A dispenser includes a housing holding an assembly, including a liquid reservoir, a pump for dispensing the fluid product, and an outlet nozzle. The pump includes a liquid chamber for containing a dose of the liquid product and a pressurizing device which allows liquid product to be drawn into or expelled from the liquid chamber. The dispenser further includes a shunting chamber including a first aperture allowing flow access to the reservoir, a second aperture allowing flow access to the outlet nozzle, and a third aperture allowing flow access to the liquid chamber. The third aperture is disposed off-axis with respect to the first and second apertures. The shunting chamber further includes a mechanically actuated governing device that has two states, one defining a flow path between the first and third apertures and one defining a flow path between the third and second apertures.

15 Claims, 9 Drawing Sheets

(56) References Cited

U.S. PATENT DOCUMENTS

| | | | |
|---|---|---|---|
| 6,209,752 B1* | 4/2001 | Mitchell et al. | 222/63 |
| 6,216,916 B1* | 4/2001 | Maddox et al. | 222/105 |
| 6,386,390 B1* | 5/2002 | Tinker | 222/52 |
| 6,688,499 B2* | 2/2004 | Zhang | 222/413 |
| 2004/0149777 A1 | 8/2004 | Santagiuliana | |
| 2004/0251271 A1* | 12/2004 | Jackson et al. | 222/63 |
| 2005/0258192 A1* | 11/2005 | Matthews et al. | 222/190 |
| 2005/0284887 A1* | 12/2005 | Lewis et al. | 222/181.3 |
| 2006/0147351 A1* | 7/2006 | Falb et al. | 422/100 |
| 2006/0219738 A1* | 10/2006 | Ilzuka et al. | 222/190 |
| 2007/0023454 A1* | 2/2007 | Ophardt | 222/190 |
| 2007/0241137 A1* | 10/2007 | Willis et al. | 222/190 |
| 2007/0272710 A1* | 11/2007 | Bui | 222/207 |
| 2009/0184136 A1 | 7/2009 | Ciavarella | |
| 2009/0294477 A1* | 12/2009 | Ciavarella et al. | 222/190 |

* cited by examiner

FLUID PRODUCT DISPENSER WITH SHUNTING CHAMBER AND GOVERNING DEVICE

This application claims the benefit of U.S. Provisional Application 61/248,622, filed Oct. 5, 2009 and claims priority to EP Application No. 09012541.0, filed Oct. 4, 2009, each of which is incorporated by reference herein in its entirety.

FIELD OF THE INVENTION

The invention relates generally to a dispenser for dispensing a fluid product and more particularly to a dispenser having a pump structure for providing a dose of fluid product to a user.

BACKGROUND

For purposes of clarity and consistency, the following terms as used throughout this text and the appended claims should be interpreted as follows:

The term "fluid" should be broadly interpreted as encompassing a liquid, a suspension of a granulate solid in a liquid, a gel, a foam, and a spray, for example.

The term "product" should be interpreted as encompassing soap (including shower gel), shampoo, disinfectant, detergent, moisturizer, hair conditioner, and exfoliating scrub, for example, including mixtures of these substances.

The "liquid product" may be dispensed directly through the outlet nozzle, or may first be mixed with another substance, such as air or another gas, or a granulate solid, for example.

The term "pump" refers to any type of pump suitable under the circumstances.

The pump in question may employ a piston, bellows, and/or membrane, for example. These points will be discussed in more detail below.

Fluid product dispensers of a type having a housing for accommodating an assembly, the assembly having a liquid reservoir for containing a liquid product, a pump, connectable to the reservoir, for dispensing the fluid product using the liquid product as an input, and an outlet nozzle, serving to convey and dispense the fluid product from the pump are known. In a typical example, the pump includes a liquid chamber, for containing a dose of the liquid product, obtainable from the liquid reservoir, and a pressurizing device, which allows liquid product to be drawn into or expelled from the liquid chamber. One example is described in U.S. Pat. No. 5,445,288 (Deb). Such dispensers are, for example, employed in washrooms, toilets, kitchens, hospitals, surgeries, hair/beauty salons, workshops and factories. In many cases, such dispensers are mounted to a wall, often in the vicinity of a basin, bath, shower or toilet bowl; alternatively, such dispensers may be free-standing, and may be placed on a shelf, worktop or wash hand basin, or a trolley. In use, the pressurizing device is typically operated by hand, arm or elbow (e.g., via a manual actuating organ, such as a lever or button) so as to dispense a quantity of fluid product. In many applications, this fluid product will be dispensed into the operator's hand, or onto a carrier such as a cloth, after which the fluid product is rubbed onto the skin, or is applied from said carrier onto a surface to be treated, such as a metal, ceramic or plastic surface to be cleaned and/or disinfected, for example. In practice, the liquid reservoir may be collapsible (e.g., in the form of a plastic pouch) or (quasi-) rigid (e.g., in the case of a bottle or tub). As an alternative to a manual actuating organ, an actuating organ employing an electric actuator is also possible; in this case, the electric actuator can be triggered by a signal from a detector that registers the presence of a member (such as a hand or cloth) onto which fluid is to be dispensed. This latter alternative is not disclosed in U.S. Pat. No. 5,445,288, but it relies on a generally known principle.

In the dispenser described in U.S. Pat. No. 5,445,288, the liquid chamber is accompanied by a co-operating (ancillary) air chamber, which is provided with its own (ancillary) pressurizing device (a piston arrangement in the case in hand). During a filling stroke, the respective pressurizing devices are used to "evacuate" the liquid and air chambers, thereby drawing a dose of liquid product into the liquid chamber from the attached liquid reservoir (through a hydraulic inlet valve), and drawing a dose of air into the air chamber (through a pneumatic inlet valve). During an ensuing dispensing stroke, the respective pressurizing devices are used to "compress" the liquid and air chambers, whence their doses of liquid product and air are simultaneously forced into the outlet nozzle, where they co-mingle in a turbulence-generating member (e.g., a sieve or mesh, a set of sieves/meshes, a porous plug, etc.) to produce foam, which is discharged through the outlet nozzle to the outside world.

In dispensers as set forth above, when the contents of the liquid reservoir are depleted, the whole assembly in the dispenser housing is replaced, i.e., the old liquid reservoir with attached (used) pump/nozzle is discarded, and a new liquid reservoir with attached (unused) pump/nozzle is mounted in the housing. This has been found to be necessary because, if only the liquid reservoir is replaced and the pump/nozzle is left in place, clogging of the dispenser can eventually occur. Conventionally, such clogging has been (primarily) attributed to oxidation of traces of liquid product that remain in the pump during its use over an extended period of time. So, although such regular replacement of the pump is a pity in terms of increased operational costs and environmental burden, it nevertheless is required in order to prevent malfunction of dispensers known from the prior-art.

SUMMARY

An aspect of an embodiment of the invention addresses this clogging issue. More particularly, embodiments of the invention may provide a dispenser with reduced operational costs. In particular, embodiments may provide a dispenser that involves less waste/environmental burden than certain other dispensers.

In an embodiment, a dispenser in accordance with the invention includes a shunting chamber including a first aperture allowing flow access to the liquid reservoir, a second aperture allowing flow access to the outlet nozzle, and a third aperture allowing flow access to the liquid chamber. The third aperture is disposed off-axis with respect to the first and second apertures, and the shunting chamber further includes a governing device that has two states, such that in a first state, a first flow path is created between the first and third apertures and in a second state, a second flow path is created between the third and second apertures. The governing device is transitionable between the two states by external mechanical action.

BRIEF DESCRIPTION OF THE DRAWINGS

The invention will now be elucidated in more detail on the basis of exemplary embodiments and the accompanying schematic drawings, in which.

In the Figures, corresponding parts are indicated using corresponding reference symbols.

DETAILED DESCRIPTION

Figure 1:
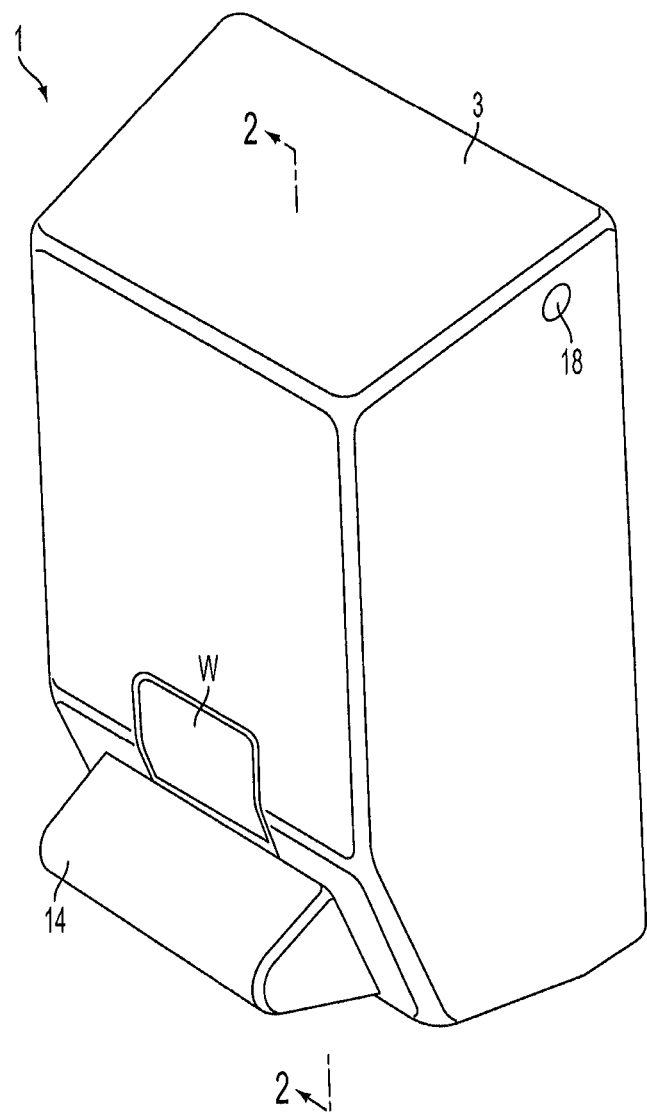
FIG. 1 renders a perspective view of a dispenser according to the prior art.

In research leading to the invention, the inventors arrived at the insight that the clogging problems referred to above are most likely to occur in the outlet nozzle rather than in the liquid chamber of the pump. This is because, in the former, fluid residue is generally present as a thin film in the presence of a relatively large body of air, so that there is a substantial fluid/air interface. The inventors thus realized that replacement of just the outlet nozzle rather than the liquid chamber/pressurizing device would be an adequate measure to reduce the risk of clogging. However, in prior-art dispensers, replacing the reservoir and outlet nozzle while re-using the liquid chamber/pressurizing device would involve a laborious and messy disassembly and re-assembly operation, requiring the use of tools (such as screwdrivers or pliers), increasing the risk of damage to—and loss of—parts, and taking valuable time, as a janitor or other attendant would need to spend several minutes opening, removing and replacing components. In addition, such an operation would often need to be conducted standing up, with no practical surface to lay parts or tools on, and often with unsatisfactory lighting levels. The extended time required to perform the operation, and the very nature of the disassembly and re-assembly, may increase the risk of leakage of liquid product onto floor areas.

To address these problems, the inventors designed a dispenser architecture in which the liquid chamber/pressurizing device are no longer connected in series with the liquid reservoir and outlet nozzle, but are instead connected in a "shunt" or "side branch" arrangement. As a result, the liquid chamber/pressurizing device are no longer "in line" with the liquid reservoir and outlet nozzle, and, accordingly, one doesn't have to get them "out of the way" in order to replace the liquid reservoir and nozzle. Instead, the liquid reservoir/pressurizing device can be embodied as a fixture that remains behind in the housing, while the rest of the assembly is removably connected to the liquid chamber via the third aperture in the shunting chamber (e.g., using a simple and user-friendly "click" fitting, or other convenient form of abutment and docking). Since the rest of the pump is "out of the way" in this manner, one can form a disposable composite part comprising the liquid reservoir and outlet nozzle (and interposed shunting chamber), and this entire composite part can be removed and replaced with a minimum of effort and mess. In this way, one wastes fewer parts (most of the pump remains behind each time the liquid reservoir is replaced), thus incurring lower operating costs and less refuse processing/environmental load.

However, providing the liquid chamber/pressurizing device in a "shunt" in this manner also has other potential advantages. In particular, because the liquid chamber/pressurizing device are no longer "in line" with the rest of the assembly, it becomes possible to use different sizes of liquid pressurizing device (and, in the case of a foam dispenser, also different sizes of air pressurizing device) with a given dispenser/disposable composite part, without having to change the dimensioning of the housing. For example, in the specific case of a foam dispenser:

Proportionately altering the size (pressurizing volume) of the employed liquid and air pressurizing devices will correspondingly alter the total dose of foam per dispensing action;

Disproportionately altering the size (pressurizing volume) of the employed liquid and air pressurizing devices will correspondingly alter the quality of the dispensed foam (by altering the relative quantities of liquid product and air mixed in each dispensing action).

In the case of "in-line" prior-art dispensers, such alteration is either impossible or requires cumbersome modification of the housing and other parts.

In an embodiment, the liquid chamber may be accompanied by an ancillary chamber. An example of such an ancillary chamber already referred to above is an air chamber, as employed in a foam dispenser. However, the ancillary chamber can also be embodied to contain substances other than air—it might, for example, contain an ancillary liquid or granulate solid to be mixed with the liquid product before being dispensed from the outlet nozzle, or it might contain a gas other than air; in these latter cases, the ancillary chamber could be connected to its own ancillary reservoir containing a supply of the respective substance to be fed to the ancillary chamber. When the dispenser according to the invention comprises such an ancillary chamber in addition to the liquid chamber, it can be useful—e.g., with an eye to facilitating the alteration possibility described in the previous paragraph—to locate the liquid chamber and ancillary chamber side-by-side; in this way, it is easy to alter either of the pressurizing devices associated with the chambers individually, or both of them together. A further aspect of such a side-by-side configuration is that, because the liquid and ancillary chambers are spaced from one another, there tends to be little or no chemical "crosstalk" between them, such as a migration of reactive vapor out of the liquid chamber and into the ancillary chamber, where it might have a detrimental chemical effect on the performance of a seal, for example. An alternative configuration involves a nested arrangement of the liquid chamber and ancillary chamber, e.g., a concentric/co-axial arrangement (as is described in a different context in U.S. Pat. No. 5,445,288, for example, in which the liquid chamber is nested within an air chamber). This configuration does not demonstrate the "spaced apart" aspect of the aforementioned side-by-side arrangement, so it is possible to make it relatively compact.

In the dispenser according to the invention, the governing device is transitioned between said two states by external mechanical actuation. By this is meant that the governing device does not change state as a result of pneumatic, hydraulic or hydrostatic effects within the assembly, but is instead operated by external mechanical actuation, e.g., a mechanical connection to the actuating organ referred to above and below. Such an arrangement may exhibit several useful characteristics. For example:

In an arrangement using hydrostatic (i.e., pressure-operated) valves—such as in U.S. Pat. No. 5,445,288—squeezing the liquid reservoir would tend to cause the valves to open, whereby liquid product would undesirably flow out of the outlet nozzle. Such squeezing could be inadvertently caused during reservoir replacement, or as a result of incorrect mounting of the reservoir in the housing, for example. In the case of a governing device that is operated by external mechanical actuation, this effect can be prevented, since squeezing the liquid reservoir will generally not actuate the governing device in such a set-up.

Hydrostatic valves only open when a sufficient pressure head has built up. A small malfunction elsewhere in the apparatus (e.g., a leak, or a resilient part that has become "tired") may prevent sufficient pressure from building up, whence the valves will no longer operate. Again, a governing device that is externally mechanically actuated will not generally suffer from this drawback.

In an exemplary aspect of the dispenser according to the current invention, the governing device includes a single moving structure that can be slid between said two states, said single moving structure serving to alternately open and close said first and second flow paths. In a particular embodiment of such a dispenser:

the shunting chamber includes a cylindrical portion;

the governing device includes a plug that is slideably mounted within the cylindrical portion, the plug being at least partially hollow;

in the first state, the plug is in a position distal from the first aperture, and the first flow path is along an external surface of the plug;

in the second state, the plug is in a position proximal to the first aperture, and the second flow path is through an interior space of the plug via an entrance in a wall of the plug and an exit in flow communication with the second aperture.

Because the liquid chamber is no longer in series with the liquid reservoir and outlet nozzle, it can be accessed via a single aperture (the above-mentioned third aperture), which acts as both an inlet and an outlet for the liquid product. Because there is only a single aperture in this manner, there is no need for the two separate liquid valves employed in U.S. Pat. No. 5,445,288 (which uses two separate apertures in its liquid chamber—an inlet aperture and a spaced-apart outlet aperture, each with its own valve). The governing device in the current invention can therefore take a totally different form to the prior-art double-valve structure. In particular, the sliding arrangement of the governing device specified in the previous paragraph (and described in greater detail below: see, for example, FIGS. 4A/4B and 8A/8B) has the following characteristics:

There is only one moving part (not two—so there are fewer parts to malfunction).

Since there is a single aperture serving both as inlet and outlet for the liquid product to/from the liquid chamber, and since the sliding plug allows only one of said two (inlet/outlet) states to exist at any one time, it is impossible for liquid product to flow continuously from the liquid reservoir out of the outlet nozzle. In contrast, if the liquid outlet valve in the dispenser set forth in U.S. Pat. No. 5,445,288 becomes jammed open (e.g., due to the presence of a piece of grit in the valve, or failure of the valve biasing spring), then the entire contents of the liquid reservoir will flow through the open inlet and outlet valves and spill out of the dispenser onto the floor below, which is a wasteful situation.

Of course, one does not have to use a governing device as set forth in the previous two paragraphs, and the skilled artisan will realize that there are many possible alternatives within the scope of the present invention. The skilled artisan will also understand how the governing device can suitably be transitioned between the aforementioned two states. For example, a dispenser according to the current invention may comprise an actuating organ that can be caused to actuate by an operator and that is mechanically connected to said governing device so as to effect said transition. Actuation of said actuating organ may be manual or electrical, for example. For example, one could employ a governing device comprising two one-way valves, a first of these valves being disposed so as to operate between the first and the third aperture, and the second of these valves being disposed so as to operate between the third and the second aperture. In this embodiment, the valves may, for example, be embodied as umbrella valves or duckbill valves, for example.

Figure 4A:
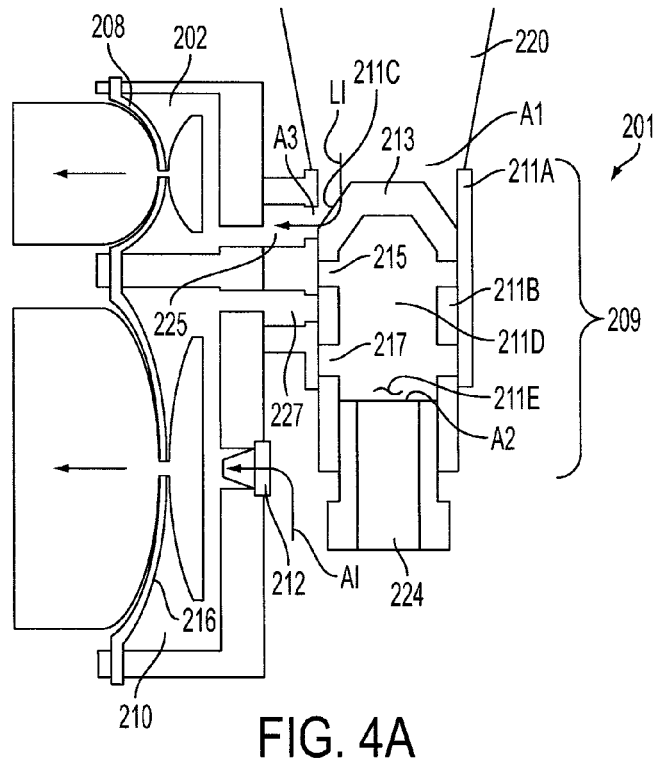
FIGS. 4A and 4B show longitudinal cross-sectional views of part of an embodiment of a dispenser in accordance with the present invention.
Figure 4B:
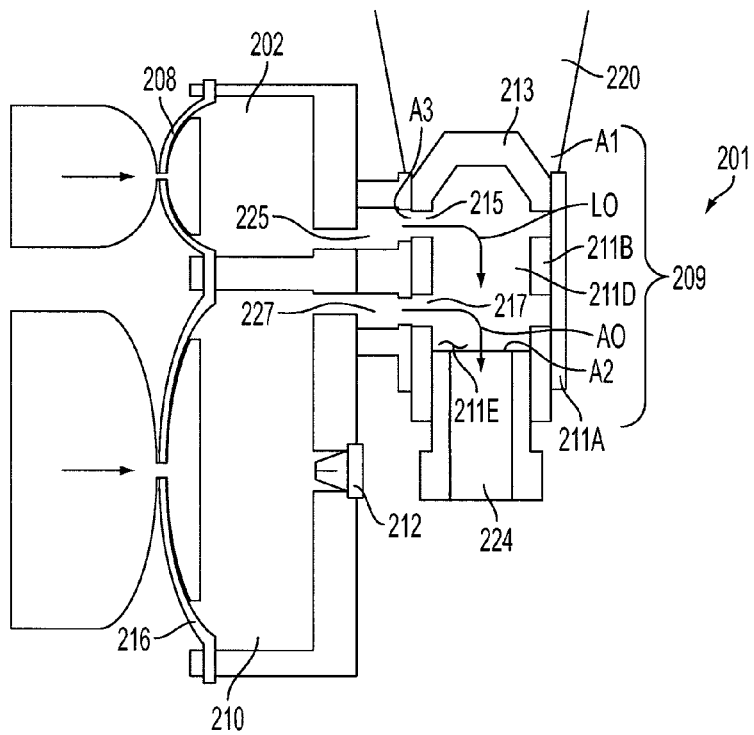

It should be explicitly noted that the second aperture referred to in this document need not be a static aperture in a fixed position in the shunting chamber; it can also be a dynamic aperture that moves within the shunting chamber, e.g., as in the case of an aperture associated with a governing device and/or outlet nozzle that slides within the shunting chamber (see, for example, FIGS. 4A and 4B). Moreover, in the case of a governing device comprising a (partially) hollow plug having an interior space, an exit of said interior space may coincide with said second aperture and/or an entrance to said outlet nozzle (once again, see FIGS. 4A and 4B, for example).

As already set forth above, in the dispenser of the current invention, the fluid product dispensed from the outlet nozzle:

Can simply be the liquid product contained in the liquid reservoir; or

Can be a foam, generated by mixing air (or another gas) with said liquid product, as explained above (and as also described in U.S. Pat. No. 5,445,288, for example); or Can be a spray. In this latter case, the outlet nozzle comprises a constriction arranged in a flow path of the fluid, and the (pressurized) passage of the liquid product through this constriction serves to generate said spray.

There are also other possibilities. For example, a granulate solid from a separate reservoir can be mixed with the liquid product to form a suspension that emerges from the outlet nozzle. In many cases, such a granulate solid can simply be present in the liquid product as stored in the liquid reservoir, so that it does not have to be added separately during the dispensing stroke of the dispenser; however, if the density of the granulate solid and/or viscosity of the liquid product are such that the granulate solid would tend to "settle", then it may be better to add it separately during the dispensing stroke.

In the case of a foam dispenser employing an (ancillary) air chamber in addition to the liquid chamber, the air chamber will have:

an air outlet that (ultimately) emerges into the outlet nozzle; and an air inlet, through which a dose of air can be sucked into the air chamber.

In a particular embodiment of the dispenser according to the invention, this air inlet:

is a passage other than the outlet nozzle;

is provided with a filter, such as a HEPA filter.

Certain aspects of such a configuration can be set forth as follows:

drawing air into the air chamber through the outlet nozzle can cause a certain amount of foam residue present in the outlet nozzle to be drawn into the air chamber. The presence of such foam residue in the air chamber can be undesirable for a number of reasons. For example:

it can produce a chemical attack on structural parts, such as seals or other resilient members;

it can oxidize and coagulate, causing congestion/clogging;

it can become septic, thus compromising hygiene.

Where possible, it is advantageous to avoid such risks, as in the case of an air inlet that is disparate from the outlet nozzle.

Drawing air into the air chamber through a filter such as a HEPA filter serves to further improve aseptic performance of the dispenser, since the presence of contaminants in the air used by the dispenser will thus be countered.

The skilled artisan will appreciate that there are many satisfactory ways of embodying such a separate/dedicated air inlet.

A separate/dedicated air inlet in an air chamber of a foam dispenser as set forth in the previous paragraph is of particular importance if, in accordance with the current invention:

the liquid chamber and air chamber and their associated pressurizing devices are mounted as fixtures in the housing, and the liquid reservoir and outlet nozzle are removably mountable as disposable components in the housing.

If the liquid/air chambers were merely to be discarded with the reservoir in accordance with the prior art, then the issues set forth in the previous paragraph would be of somewhat lesser importance, since the liquid/air chambers would be regularly replaced. However, when the liquid/air chambers remain in place, issues of chemical degradation of parts, coagulation/clogging and septic contamination in the air chamber become much more significant, and need to be stringently mitigated.

As regards the pressurizing device(s) alluded to above and in the appended claims, the skilled artisan will be able to recognize and achieve many possible embodiments within the sphere of his knowledge and the scope of his ability. For example, the pressurizing device(s) may employ:

(i) A piston principle. In this case, the liquid chamber (and/or ancillary chamber) may be embodied as a cylindrical tube in which a plunger can be axially moved. An actuating organ as referred to above can then be connected to this plunger, for example.

(ii) A bellows principle. In this case, the wall of the liquid chamber (and/or ancillary chamber) is embodied to be flexible and collapsible, as in the case of a concertina arrangement or balloon arrangement. The above-mentioned actuating organ can then be connected to an extremity of this bellows, serving to move it toward and away from an opposite extremity of the bellows.

(iii) A membrane principle. In this case, only a portion of the liquid chamber (and/or ancillary chamber)—e.g., one of its walls—is embodied as a flexible sheath ("membrane"). Said actuating organ can then be connected to this sheath.

As an alternative to these possibilities, one could conceive a pressurizing device employing an impeller, for example.

It should be noted that, in a pressurizing device relying on a bellows principle as alluded to in item (ii) of the previous paragraph, a particular embodiment of the present invention is characterized in that the bellows involved is biased in an extended state using an external spring device. A bellows can be embodied to be self-biasing to some extent (e.g., when it takes the form of a concertina structure comprising a resilient material such as plastic); however, when such a bellows is used for a relatively long time, and particularly when it is exposed to a relatively "harsh" chemical environment (e.g., in pumping soaps, detergents, disinfectants, or other such substances), there is a danger that the bellows will become "tired", and will lose its self-biasing characteristics to a lesser or greater extent. To mitigate such an effect, any intrinsic self-biasing tendency of the bellows is preferably augmented using extrinsic biasing on the basis of an external spring device. For example, a coil spring or leaf spring can be anchored in the housing and attached to the bellows in such a way that it tends to urge the bellows into its extended state (corresponding to relatively large internal volume), e.g., when a dispensing stroke is finished (during which the bellows attains a relatively small internal volume).

Example 1

Prior Art

FIG. 1 renders a schematic perspective view of part of a dispenser 1 for dispensing a fluid product, in accordance with the prior art.

FIG. 1 shows a housing 3, which can be mounted to a wall of a washroom, for example. The housing 3 accommodates an assembly C that comprises a liquid reservoir 20, for containing a liquid product, an attached pump 22, and an outlet nozzle 24; these items are only visible in FIG. 2, and will be discussed later in more detail. An actuating organ 14 is incorporated in the housing 3, and can be actuated so as to operate said pump 22. Also shown are an inspection window W, which allows the amount of liquid product in the liquid reservoir 20 to be seen from outside. An aperture 18 allows insertion of a tool with the aid of which the housing 3 can be unlocked and opened, allowing access to the assembly C (liquid reservoir 20+pump 22+outlet nozzle 24) located within. The housing 3 is made from any suitable rigid material, such as metal or a plastic, for example.

Figure 2:
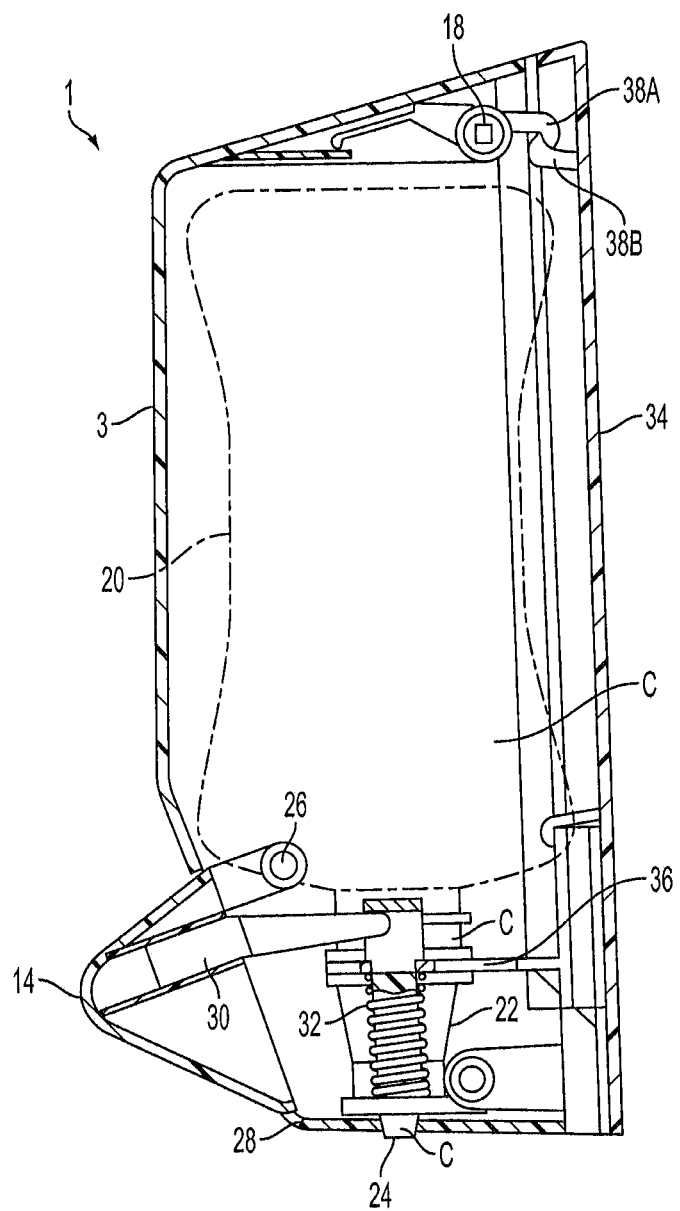
FIG. 2 shows a longitudinal cross-section of the subject of FIG. 1.

FIG. 2 renders a cross-sectional view of the subject of FIG. 1, taken along the line 2-2. The liquid reservoir 20 is now visible, and is here embodied as a flexible plastic container, such as a pouch. The liquid product contained in the reservoir 20 may, for example, comprise soap, shower/bath gel, detergent, disinfectant, exfoliating scrub, or mixtures of (certain of) these products.

A pump 22 is attached to the underside of the liquid reservoir 20, so as to be able to draw liquid product from within the liquid reservoir 20. The pump 22 may be any suitable type of pump for the application in question, such as a liquid pump, spray pump or foam pump, for example, and may operate on the basis of a movable piston, bellows and/or membrane, for example. In operation, the pump 22 may directly dispense the liquid contained within the reservoir 20, or may first mix it with air to form a spray or foam, for example. In all cases, the pump 22 dispenses a fluid product from the outlet nozzle 24. More information with regard to pumps suitable for use in this type of application can, for example, be gleaned from U.S. Pat. No. 5,271,530 (Daiwa Can Company) and US 2004/0149777 A (Taplast)—which are incorporated herein by reference—and from the website www.airspray.nl.

As can be seen in FIG. 2, the actuating organ 14 in this instance is hinged to the housing 3 via a hinge joint 26. This, together with the gap 28 below the actuating organ 14, ensures that the actuating organ 14 can be swung in and out of the housing 3. An arm 30 connects the actuating organ 14 to the pump 22 in such a manner that, when the actuating organ 14 is swung into the housing 3 about hinge joint 26, arm 30 operates pump 22 so as to dispense a dose of fluid product through the outlet nozzle 24. A biasing device, such as a spring 32, ensures that the actuating organ 14 is urged back into its swung-out position when released. In many applications, a user depresses the actuating organ 14 using his hand palm, lower arm or elbow, for example, and collects the fluid product dispensed from the outlet nozzle 24 in his hand or on a carrier (such as a cloth or tissue); in such applications, the outlet nozzle 24 will generally face substantially downward.

The pump 22 is removably mounted to a bracket 36 that protrudes from the back wall 34 of the housing 3. This back wall 34 can be provided with screw-holes, magnets, or other means for mounting it to a wall or other surface. Also protruding from the back wall 34 is a lug 38B, which grips a cooperating lug 38A; using a tool inserted through aperture 18, these two lugs 38A, 38B can be disengaged, allowing the housing 3 to be opened so as to replace the assembly C inside when the liquid reservoir 20 has become depleted.

Example 2

Prior Art

In the set-up depicted in FIG. 2, and in the dispensers disclosed in all of the above-mentioned prior-art documents (U.S. Pat. No. 5,445,288, U.S. Pat. No. 5,271,530, US 2004/0149777 A), the pump 22 has an "on-axis" or "in-line" architecture. This terminology will be elucidated in more detail below, but, first, the general structure of such a pump will be briefly discussed.

Figure 3:
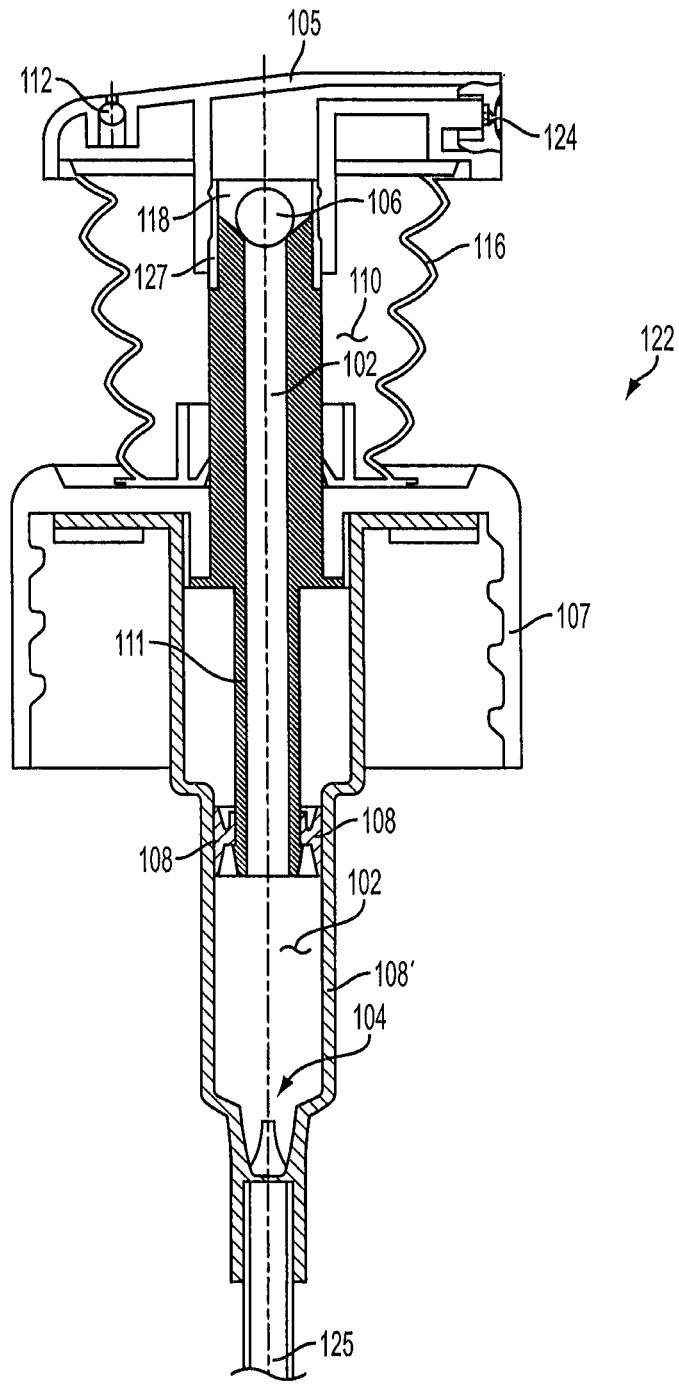
FIG. 3 shows a longitudinal cross-section of a prior-art foam pump, suitable for use in a dispenser according to the prior art.

FIG. 3 shows a longitudinal cross-section of a prior-art foam pump 122, which can be used to provide the functionality of pump 22 in FIG. 2, for example. The pump 122 comprises:

A liquid chamber 102 for containing a dose of liquid product.

A pressurizing device 108, 108', 111 (in this case, a piston arrangement), which allows liquid product to be drawn into or expelled from the liquid chamber 102.

A liquid inlet valve 104 for admitting a dose of liquid product into the liquid chamber 102. Such admission occurs through an inlet passage 125 that can be connected to a liquid reservoir (not depicted, but analogous to item 20 in FIG. 2).

A liquid outlet valve 106 for regulating passage of liquid product from the liquid chamber 102 to outlet nozzle 124. Also present are:

An ancillary chamber 110, which in the current case is an air chamber for containing a dose of air.

An ancillary pressurizing device 116 (in this case, a bellows arrangement), which allows air to be drawn into or expelled from the ancillary chamber 110.

An air inlet valve 112, for admitting air into the air chamber 110.

An air outlet device 127, for conducting air from the air chamber 110 to outlet nozzle 124.

A member 118 for generating turbulence in fluid passing therethrough (whereby it should be explicitly noted that the member 118 may have a composite structure, e.g., comprising a series arrangement of two or more sieves/meshes).

In the illustrated embodiment, the following design choices have been made:

The pressurizing device 108, 108', 111 is embodied as a piston, with a piston shaft 111 and an attached piston head 108, which can be moved telescopically in and out of a piston tube 108'. The piston shaft 111 is hollow, and has a central passage that forms part of the liquid chamber 102. Moving dispensing head 105 toward collar 107 causes the piston head 108 to start a compression stroke, applying pressure to a body of liquid product present in the liquid chamber 102, and thus forcing liquid product from the liquid chamber 102 through the liquid outlet valve 106. On the other hand, moving dispensing head 105 away from collar 107 causes the piston 108 head to start a relaxation stroke, causing negative pressure to build up in the (empty) liquid chamber 102. If desired, elastic biasing means (such as a spring) can be employed to ensure that the piston head 108 starts its relaxation stroke of its own accord once it is released from its compression stroke.

The ancillary pressurizing device 116 is embodied as a bellows, within which air chamber 110 is located. Moving dispensing head 105 toward collar 107 compresses the bellows 116, reducing the volume of the air chamber 110 and thus forcing air from the air chamber 110 through the air outlet device 127. On the other hand, moving dispensing head 105 away from collar 107 causes the bellows 110 to relax, whereby air will be sucked into the bellows 110 through the air inlet valve 112. If the bellows 110 is made of resilient material, such as flexible plastic or rubber, it will be self-relaxing.

The liquid chamber 102 and air chamber 110 are in nested, co-axial arrangement. The skilled artisan will appreciate that these are free design choices, and that other worthy alternatives are available, as alluded to earlier in this text.

In FIG. 3, the liquid chamber 102 is in an "on-axis" or "in-line" configuration, in the sense that the liquid chamber 102 is disposed in series arrangement with the liquid inlet valve 104 and the liquid outlet valve 106. Consequently, if one wants to dispose of the outlet nozzle 124 and the liquid reservoir (20; not shown) connected to inlet passage 125, but wants to leave behind the liquid chamber 102 and associated pressurizing device 108, 108', 111, then the pump 122 will have to be disassembled, in a cumbersome and time-consuming fashion.

Embodiment 1

FIGS. 4A and 4B show longitudinal cross-sectional views of part of an embodiment of a dispenser 201 according to an embodiment of the current invention. As in the Examples above, this dispenser 201 comprises a housing (not depicted) for removably accommodating an assembly C comprising a liquid reservoir, a pump and an outlet nozzle. However, unlike the Examples above, the current dispenser 201 exploits a "side branch" or "off-axis" architecture (rather than an "in-line" architecture"), as will now be elucidated in more detail.

In FIGS. 4A, 4B, a liquid reservoir 220 is now connected to a shunting chamber 209. This shunting chamber 209 comprises:

a first aperture A1 allowing flow access to the liquid reservoir 220;

a second aperture A2 allowing flow access to an outlet nozzle 224;

a third aperture A3 allowing flow access to a liquid chamber 202, whereby the third aperture A3 is disposed off-axis with respect to the first aperture A1 and second aperture A2. The shunting chamber 209 further comprises a governing device 213 that has two states, such that:

in a first state, a first flow path LI is created between the first aperture A1 and third aperture A3;

in a second state, a second flow path LO is created between the third aperture A3 and second aperture A2.

Also depicted in FIGS. 4A, 4B is an air chamber 210. This air chamber 210 has a dedicated one-way air inlet valve 212 (e.g., a duckbill valve) and air outlet passage 227. The air chamber 210 and liquid chamber 202 are disposed in a side-by-side arrangement (unlike the nested arrangement of FIG. 3, for example). Note that the air inlet valve 212 is disparate from the outlet nozzle 224.

The liquid chamber 202 is provided with a pressurizing device 208, and the air chamber 210 is provided with an ancillary pressurizing device 216, both of these pressurizing devices 208, 216 being embodied as, for example, a bellows or membrane structure.

In the current case:

the shunting chamber 209 comprises a cylindrical portion 211A;

the governing device 213 comprises a plug 211B that is (at least partially) hollow and that is slidably mounted within the cylindrical portion 211A;

in the first state (FIG. 4A), the plug 211B is in a position distal from the first aperture A1, and the first flow path LI is along an external surface 211C of the plug 211B;

in the second state (FIG. 4B), the plug 211B is in a position proximal to the first aperture A1, and the second flow LO path is through an interior space 211D of the plug 211B via an entrance 215 in a wall of the plug 211B and an exit 211E in flow communication with the second aperture A2.

(I) FIG. 4A shows the fill (or charge) state of the dispenser 201. Here, the plug 211B is withdrawn away from aperture A1 so as to allow liquid product from the reservoir 220 to flow along a beveled edge 211C of the plug 211B and through aperture A3 and passage 225 into liquid chamber 202, as shown by arrow LI. Such flow is instigated by:

operating the pressurizing device 208 (withdrawing it), so as to increase the volume of liquid chamber 202;

using external mechanical actuation to pull the plug 211B downward in the cylindrical portion 211A.

Both of these actions may be performed by appropriately connecting items 208 and 211B to a suitable actuating organ (not shown here; see item 14 in FIGS. 1 and 2)—for example, a lever or button that is allowed to relax outward as a result of a biasing force provided by a spring member.

In a concurrent action, air is drawn into air chamber 210 (shown by arrow AI) through one-way valve 212, by operating the ancillary pressurizing device 216 (withdrawing it), so as to increase the volume of air chamber 210. This action may also be realized by appropriately connecting ancillary pressuring device 216 to said actuating organ 14.

The plug 211B is engineered in such a manner that, when in this withdrawn state, apertures 215 and 217 in its wall are opposed to closed portions of the inner surface of cylindrical portion 211A. In this manner, air outlet passage 227 is blocked.

(II) FIG. 4B shows the dispensing (or discharge) state of the dispenser 201. Here, the plug 211B is urged toward aperture A1 in such a manner as to cause the following concurrent actions/states:

aperture A1 to be blocked by a portion of a wall of plug 211B, thus curtailing flow path LI;

opening 215 in a wall of plug 211B to mate with aperture A3, thus allowing a flow of liquid—as shown by arrow LO—out of the liquid chamber 202 into the interior space 211D of plug 211B, and ultimately through aperture A2 into outlet nozzle 224;

opening 217 in the wall of plug 211B to mate with air outlet passage 227, thus allowing a flow of air—as shown by arrow AO—out of the air chamber 210 into the interior space 211D of plug 211B, and ultimately through aperture A2 into outlet nozzle 224.

Such actions are instigated by:

operating the pressurizing device 208 (advancing it), so as to decrease the volume of liquid chamber 202;

operating the ancillary pressurizing device 216 (advancing it), so as to decrease the volume of air chamber 210;

using external mechanical actuation to push the plug 211B upward in the cylindrical portion 211A.

Once again, all of these actions may be performed by appropriately connecting items 208, 216 and 211B to said suitable actuating organ (not shown here; see item 14 in FIGS. 1 and 2)—for example, said lever or button that is now pushed inward. The flows of liquid product (LO) and air (AO) into the outlet nozzle 224 co-mingle to form foam. This is achieved with the aid of a turbulence generating member (not depicted) within outlet nozzle 224.

Embodiment 2

Figure 5A:
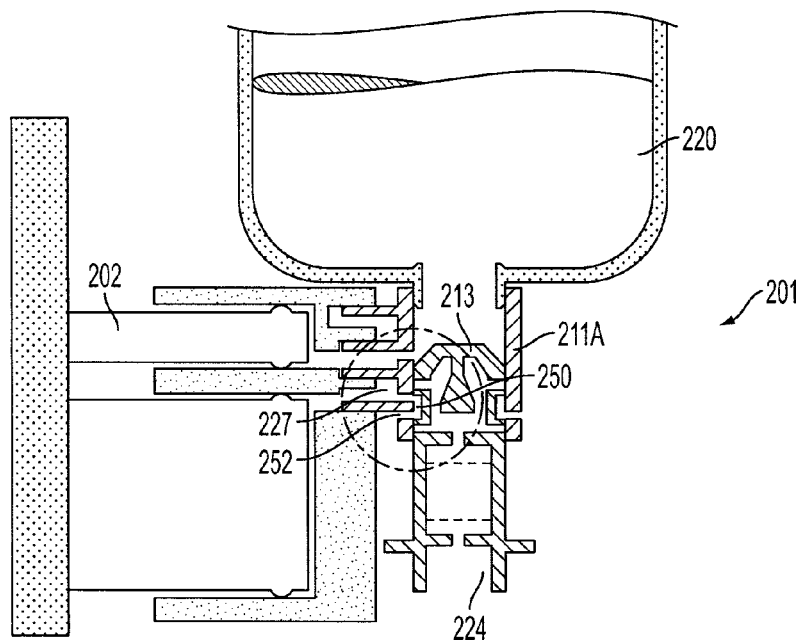
FIGS. 5A and 5B show longitudinal cross-sectional views of part of another embodiment of a dispenser in accordance with the present invention.
Figure 5B:
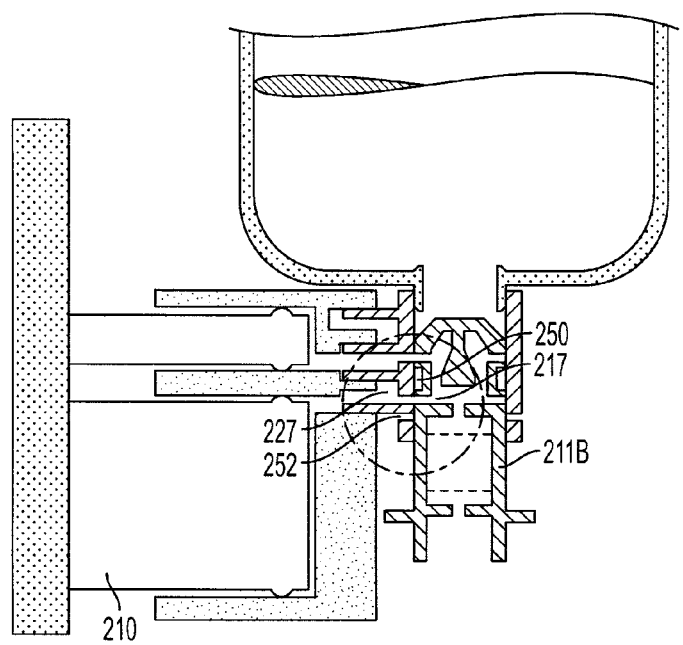

FIGS. 5A and 5B show longitudinal cross-sectional views of part of a further embodiment of a dispenser according to the present invention. This further embodiment is basically identical to that set forth in Embodiment 1 above, except as regards certain details of the air inlet mechanism, which is located within the broken circle in FIGS. 5A and 5B. For purposes of clarity, only the differences w.r.t. the air inlet mechanism of Embodiment 1 will be elucidated here.

In the current Embodiment, the duckbill valve 212 of FIGS. 4A and 4B is no longer employed. Instead, part of the wall of the plug 211B has been provided with an appropriately positioned cavity 250. In addition, passage 227 now functions as an air inlet passage as well as an air outlet passage. This set-up operates as follows:

In FIG. 5A, the plug 211B is in its "withdrawn" state, and the dispenser 201 is in its filling stroke. In this configuration, cavity 250 is positioned in such a manner as to form a connecting channel between passage 227 and passage 252, which emerges into the outside world. In this manner, air can be drawn into the air chamber 210 via the route 252, 250, 227.

In FIG. 5B, the plug 211B is in its "advanced" state, and the dispenser 201 is in its dispensing stroke. In this configuration, cavity 250 is positioned in such a manner as to blindly face an opposing portion of the wall 211A, which serves to seal the cavity 250; as a consequence, there is no longer a connecting channel between passage 227 and passage 252. Instead, passage 227 now mates with passage 217, allowing air to be discharged from the air chamber 210 into the nozzle 224.

This embodiment has the advantage of obviating the (relatively expensive) duckbill valve 212 of Embodiment 1.

Embodiment 3

Another embodiment of a dispenser according to the present invention is identical to that set forth in Embodiments 1 or 2 above, but comprises additional aspects that will now be further elucidated. For purposes of clarity, only substantial aspects of the current embodiment that were not discussed in Embodiments 1 or 2 above will receive attention here.

Figure 6:
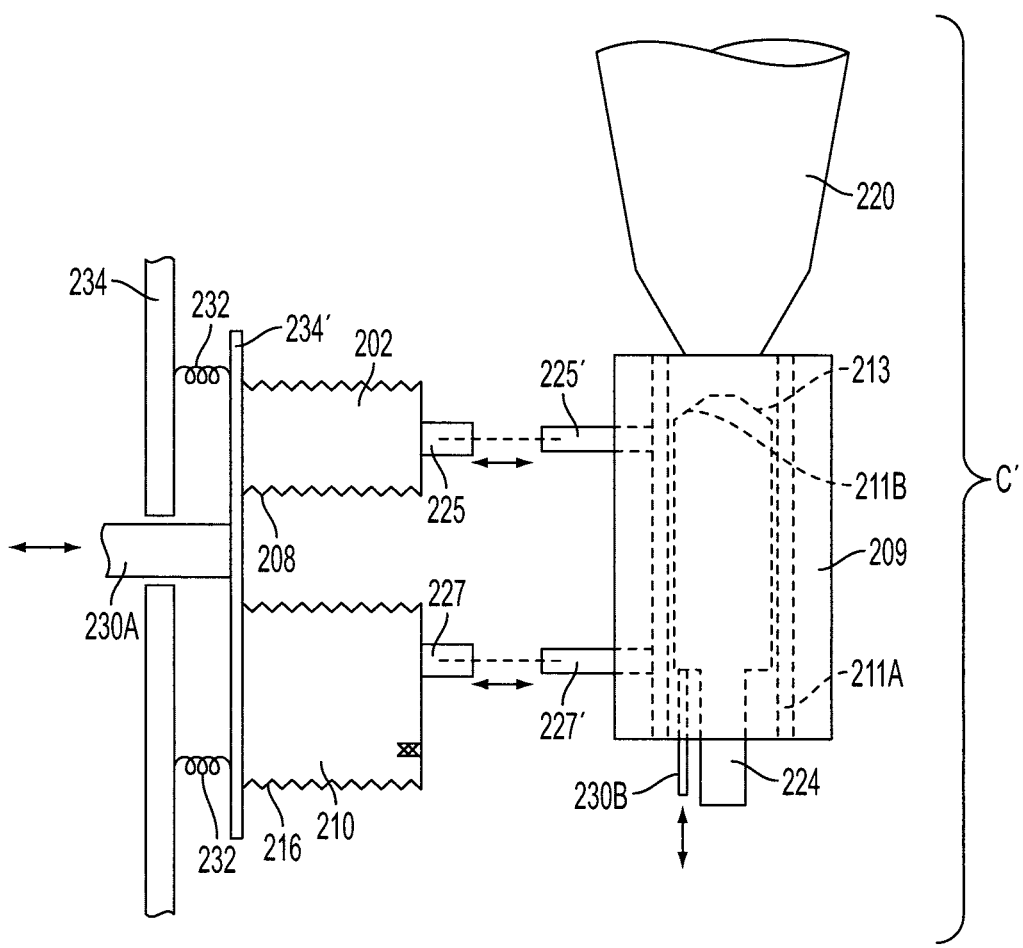
FIG. 6 renders an end view of part of yet another embodiment of a dispenser in accordance with the present invention.

FIG. 6 shows an end view of part of a dispenser according to the current invention. In the Figure, an assembly C'—which comprises a liquid reservoir 220, shunting chamber 209 and outlet nozzle 224—is being put in position, as part of a replacement operation. To this end, the housing of the dispenser has been opened, and a previous assembly (not depicted)—of which the liquid reservoir was depleted—has been detached from the liquid chamber 202 and air chamber 210, such that:

The liquid chamber 202 and air chamber 210 remain as fixtures mounted to a back wall 234 of the housing;

The previous assembly is disposed of.

Figure 7:
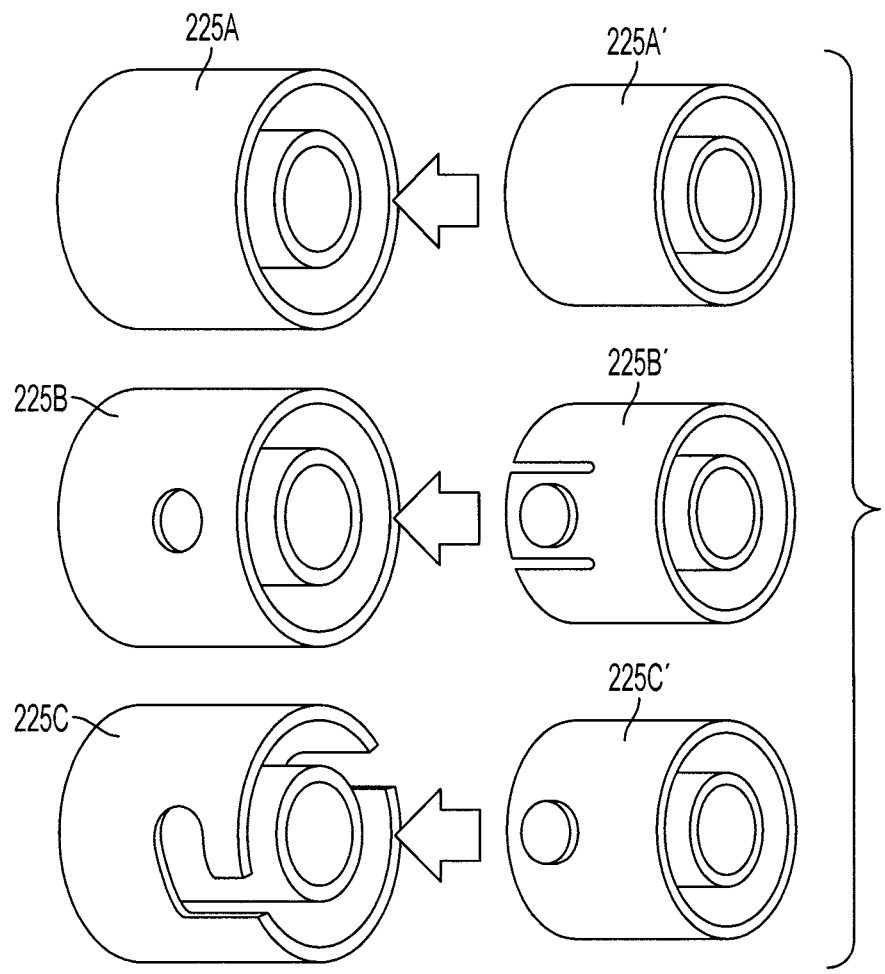
FIG. 7 shows perspective views of various possible embodiments of part of the subject of FIG. 6.

Thereafter, the new assembly C'—of which the liquid reservoir 220 is full—is put into position. To this end, the shunting chamber 209 of the assembly C' is provided with members 225', 227' that mate with the illustrated liquid passage 225 and air passage 227, respectively. Such mating can be achieved in various ways that will be readily understood by a skilled artisan and, by way of example, three of these are depicted (in perspective view) in FIG. 7, as follows:

In the upper portion of FIG. 7, member 225A' fits into member 225A via a simple pressure fit. Non-depicted members 227A' and 227A can (but do not have to) be mated using a similar pressure fit principle.

In the middle portion of FIG. 7, member 225B' fits into member 225B via a rudimentary click system. Once again, non-depicted members 227B' and 227B can (but do not have to) be mated using a similar click system.

In the lower portion of FIG. 7, member 225C' fits into member 225C via a bayonet coupling. Once again, non-depicted members 227C' and 227C can (but do not have to) be mated using a similar bayonet connection.

Returning now to FIG. 6, the liquid chamber 202 and air chamber 210 are embodied as respective bellows 208, 216 in this particular instance. A "head" of each of these bellows 208, 216 (opposite the respective passages 225, 227) is affixed to a plate 234', which is spring-mounted to the back wall 234 of the dispenser using springs 232, which springs 232 serve to urge plate 234' toward wall 234, thus biasing the bellows 208, 216 in their extended state. A rod 230A is attached to plate 234', and this rod 230A passes through an opening in plate 234 such that, by moving this rod 230A back and forth, the bellows 208 and 216 can be actuated, i.e., caused to contract and extend. Similarly, a rod 230B is attached to plug 211B such that, by moving rod 230B up and down, plug 211B can be caused to slide in cylindrical portion 211A. Rod 230A is connected to an actuating organ (such as item 14 in FIG. 1, or an electric actuator that is triggered by a proximity detector, for example), and rod 230B is removably connectable to that same actuating organ, the connections involved being embodied in such a manner that both rods 230A, 230B can be simultaneously withdrawn or simultaneously advanced using a single motion of said actuating organ. The design of such connections is well within the scope of experience and spectrum of expertise of the skilled artisan, and may involve the use of well-known parts, such as levers, cams, pivots, rack-and-pinion devices, etc.

As depicted in FIG. 6, items 211B/230B are actuated in a vertical direction, whereas items 234'/230A are actuated in a horizontal direction, If desired, the depicted construction can be altered such that bellows 208 and 216 are now also arranged and actuated vertically, in which case items 234'/230A will also be actuated vertically.

Embodiment 4

Figure 8A:
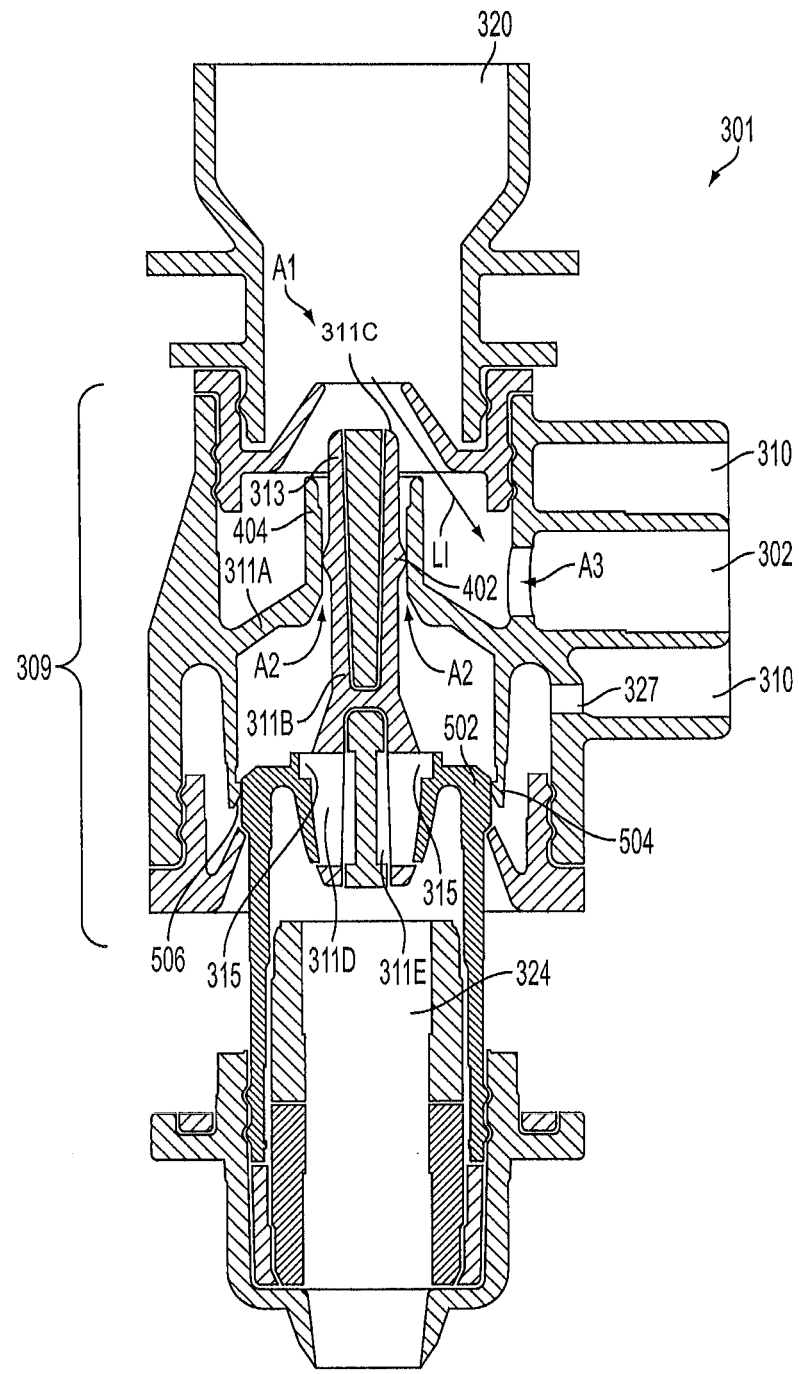
FIGS. 8A and 8B render longitudinal cross-sectional views of part of yet another embodiment of a dispenser in accordance with the current invention.
Figure 8B:
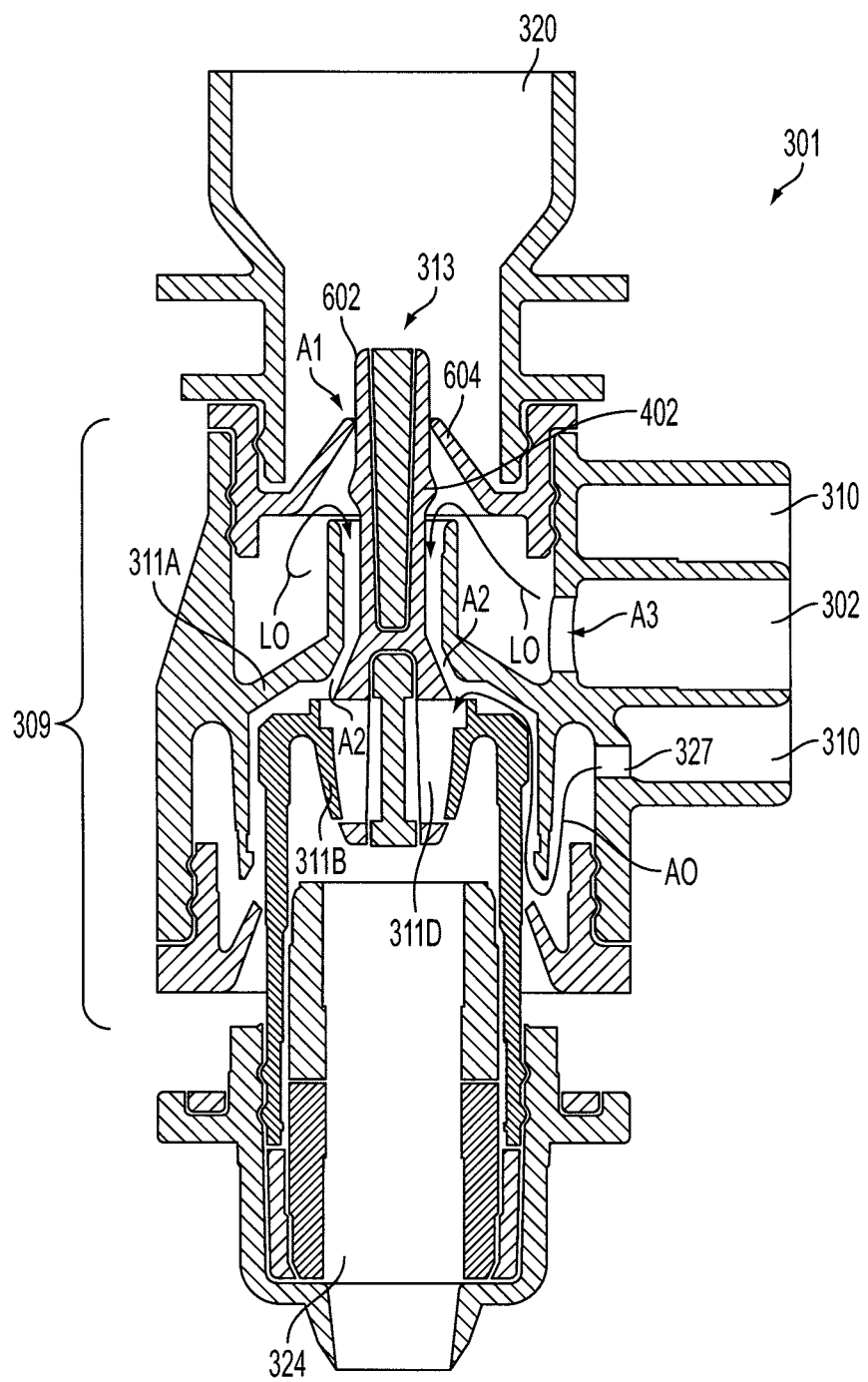

FIGS. 8A and 8B show longitudinal cross-sectional views of part of a dispenser 301 according to an embodiment of the current invention. This current embodiment shows certain similarities with that set forth in Embodiment 1 and FIGS. 4A/4B above, but also certain differences. Some of these similarities and differences will now be elucidated in more detail in what follows.

As in Embodiment 1 above, the dispenser 301 of the current embodiment comprises a housing (not depicted) for removably accommodating an assembly C comprising a liquid reservoir, a pump and an outlet nozzle. Once again, the current dispenser 301 exploits a "side branch" or "off-axis" architecture (rather than an "in-line" architecture").

In FIGS. 8A, 8B, a liquid reservoir 320 is connected to a shunting chamber 309 that includes:
A first aperture A1 allowing flow access to the liquid reservoir 320;
A second aperture A2 allowing flow access to an outlet nozzle 324;
A third aperture A3 allowing flow access to a liquid chamber 302, whereby the third aperture A3 is disposed off-axis with respect to the first aperture A1 and second aperture A2. The shunting chamber 309 further comprises a governing device 313 that has two states, such that:
In a first state, a first flow path LI is created between the first aperture A1 and third aperture A3;
In a second state, a second flow path LO is created between the third aperture A3 and second aperture A2.

Also depicted in FIGS. 8A, 8B is an air chamber 310. This air chamber 310 has an air inlet valve (not depicted) and air outlet passage 327. The air chamber 310 and liquid chamber 302 are disposed in an arrangement that is initially concentric, but that subsequently branches out (bifurcates) into a side-by-side arrangement (not depicted). The employed air inlet valve (not depicted) is disparate from the outlet nozzle 324. The liquid chamber 302 and air chamber 310 are provided with respective pressurizing devices (not depicted; but, for example, of types such as already shown/discussed above).

In analogy to the situation in Embodiment 1 above:
The shunting chamber 309 comprises a cylindrical portion 311A;
The governing device 313 comprises a (partially) hollow plug 311B that is slidably mounted within the cylindrical portion 311A;
In the first state (FIG. 8A), the plug 311B is in a position distal from the first aperture A1, and the first flow path LI is along an external surface 311C of the plug 311B;
In the second state (FIG. 8B), the plug 311B is in a position proximal to the first aperture A1, and the second flow LO path is through an interior space 311D of the plug 311B via an entrance 315 in a wall of the plug 311B and an exit 311E in flow communication with the second aperture A2.
However, the manner in which the shunting chamber 309 and governing device 313 cooperate in order to open and close (allow and curtail) the various flow paths LI, LO—and also AO (see below)—is different to the scenario set forth in Embodiment 1 above, as will now be explained.

(i) In the current set-up, an upper portion of the plug 311B is provided with an external, circumferential lip 402 that—in the abovementioned first state (FIG. 8A)—is brought into contact with an internal surface of an upper element 404 of cylindrical portion 311A. This upper element 404 has a mildly tapering interior surface, and is made of mildly flexible material (such as PE, for example), so that, as the plug 311B is withdrawn downward, the lip 402 establishes a good seal with the internal surface of element 404, thus curtailing any flow of liquid product past the lip 402. As such, the only available flow path for liquid product is along the trajectory LI into the liquid chamber 302.

In a similar manner, an external, circumferential lip 502 on a lower portion of the plug 311B cooperates with an internal surface of a lower element 504 of cylindrical portion 311A. Said lower element 504 itself contains an internal, circumferential lip 506. In the situation shown in FIG. 8A, the lips 504 and 506 abut against one another, thus forming a seal that curtails flow of air past the lips 504/506.

(ii) In the scenario depicted in FIG. 8B (the abovementioned second state), the plug 311B has been displaced upward w.r.t. the cylindrical portion 311A. In this state:
Aperture A1 is sealed. Such a seal is realized by abutment of an outer surface 602 of the plug 311B against an inner surface of a capping element 604 of cylindrical portion 311A, the capping element being made of mildly flexible material.

Liquid product flow path LO is opened, since lip 402 is now pulled out of contact with the mating inner surface of upper element 404.

Air flow path AO is opened, since lips 504 and 506 are no longer in abutment.

In the current embodiment, air following path AO ultimately enters the interior space 311D of the plug 311B via a castellated structure disposed about the cylindrical axis of the plug 311B. In so doing, it commingles with liquid product following path LO, thus forming a (pre-) foam that can subsequently be refined by passage through one or more turbulence generating members (not depicted) within outlet nozzle 324.

The invention claimed is:

1. A dispenser for dispensing a fluid product, comprising a housing for accommodating an assembly, the assembly comprising:
   a liquid reservoir, for containing a liquid product;
   a pump, connectable to the reservoir, for dispensing the fluid product using the liquid product as an input;
   an outlet nozzle, serving to convey and dispense the fluid product from the pump;
   whereby the pump comprises:
      a liquid chamber, for containing a dose of the liquid product, obtainable from the liquid reservoir;
      a pressurizing device, which allows liquid product to be drawn into or expelled from the liquid chamber,
   wherein the dispenser is further provided with a shunting chamber comprising:
      a first aperture allowing flow access to the liquid reservoir;
      a second aperture allowing flow access to the outlet nozzle;
      a third aperture allowing flow access to the liquid chamber,
   the third aperture being disposed off-axis with respect to the first and second apertures, the shunting chamber further comprising a governing device that has two states, such that:
      in a first state, a first flow path is created between the first and third apertures;
      in a second state, a second flow path is created between the third and second apertures,
   and wherein:
      the liquid chamber and pressurizing device are mounted as fixtures in the housing, and;
      the liquid reservoir and outlet nozzle are removably mountable as disposable components in the housing.

2. A dispenser according to claim 1, wherein the governing device comprises a single moving structure that can be slid between said two states, said single moving structure serving to alternately open and close said first and second flow paths.

3. A dispenser according to claim 2, further comprising an actuating organ that can be caused to actuate by an operator and that is mechanically connected to said governing device so as to effect its transition between said two states.

4. A dispenser according to claim 1, wherein the governing device comprises two one-way valves, a first of these valves being disposed so as to operate between the first and the third aperture, and the second of these valves being disposed so as to operate between the third and the second aperture.

5. A dispenser according to claim 4, wherein the one-way valves are selected from the group comprising umbrella valves and duckbill valves.

6. A dispenser according to claim 1, wherein:
   the third aperture can be removably mated with the liquid chamber;
   the liquid reservoir, shunting chamber and outlet nozzle are fixed to one another and are disposable as a whole.

7. A dispenser according to claim 1, additionally comprising:
   an air chamber, for containing a dose of air, obtainable from a space outside the assembly;
   an ancillary pressurizing device, which allows air to be drawn into or expelled from the air chamber,
   such that:
      both the liquid chamber and the air chamber are connectable to the outlet nozzle;
      the outlet nozzle comprises a member for generating turbulence in fluid passing therethrough;
      the fluid dispensed from the outlet nozzle is a foam.

8. A dispenser according to claim 7, wherein:
   air is drawn into the air chamber via an air inlet that is not the outlet nozzle;
   said air inlet is provided with a filter.

9. A dispenser according to claim 1, wherein:
   the dispenser comprises an ancillary chamber in addition to the liquid chamber;
   the ancillary chamber and liquid chamber are arranged side-by-side.

10. A dispenser according to claim 1, wherein:
    the outlet nozzle comprises a constriction arranged in a flow path of the fluid;
    the fluid dispensed from the outlet nozzle is a spray.

11. A dispenser according to claim 1, wherein the pressurizing device is chosen from the group comprising a bellows, a piston and a membrane.

12. A dispenser according to claim 11, wherein:
    the pressurizing device comprises a bellows;
    the bellows is biased in an extended state using an external spring device.

13. A dispenser according to claim 1, wherein the housing comprises an actuating element selected from the group consisting of:
    (i) a manual actuating organ movably connected to the housing and serving to operate at least said pressurizing device, and
    (ii) an automated actuator comprising:
       a detector, for detecting that a member onto which fluid is to be dispensed has been offered to the outlet nozzle, and
       an electric actuator, for operating at least the pressurizing device in response to a signal output from the detector.

14. A dispenser for dispensing a fluid product, comprising a housing for accommodating an assembly, the assembly comprising:
    a liquid reservoir, for containing a liquid product;
    a pump, connectable to the reservoir, for dispensing the fluid product using the liquid product as an input;
    an outlet nozzle, serving to convey and dispense the fluid product from the pump;
    wherein the pump comprises:
       a liquid chamber, for containing a dose of the liquid product, obtainable from the liquid reservoir;
       a pressurizing device, which allows liquid product to be drawn into or expelled from the liquid chamber,
    wherein the dispenser is further provided with a shunting chamber comprising:
       a first aperture allowing flow access to the liquid reservoir;
       a second aperture allowing flow access to the outlet nozzle;
       a third aperture allowing flow access to the liquid chamber,
    the third aperture being disposed off-axis with respect to the first and second apertures, the shunting chamber further comprising a pair of one-way valves, a first valve of the pair of valves being disposed so as to operate between the first and the third aperture, and the second valve of the pair of valves being disposed so as to operate between the third and the second aperture, the pair of valves cooperating to provide two operational states wherein:
- in a first state, a first flow path is created between the first and third apertures;
- in a second state, a second flow path is created between the third and second apertures, and wherein:
- the liquid chamber and pressurizing device are mounted as fixtures in the housing, and;
- the liquid reservoir and outlet nozzle are removably mountable as disposable components in the housing.

15. A dispenser according to claim 14, wherein the one-way valves are selected from the group comprising umbrella valves and duckbill valves.

* * * * *